Figure 1:
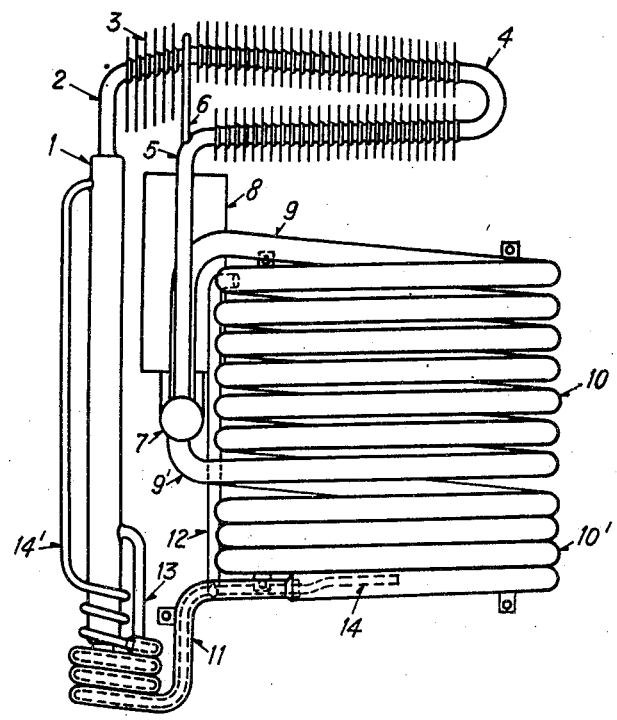

Sept. 12, 1950     O. DOEBELI     2,521,781

ARRANGEMENT FOR ABSORPTION COOLING SYSTEMS

Filed Jan. 27, 1945

INVENTOR:

Oscar Doebeli

BY Richards y Geier

ATTORNEYS

Patented Sept. 12, 1950

2,521,781

UNITED STATES PATENT OFFICE 2,521,781

ARRANGEMENT FOR ABSORPTION COOLING SYSTEMS

Oscar Doebeli, Zurich, Switzerland

Application January 27, 1945, Serial No. 574,880
In Switzerland November 3, 1943

Section 1, Public Law 690, August 8, 1946
Patent expires November 3, 1963

3 Claims. (Cl. 62—119.5)

1

Cooling systems working on the absorption principle are provided with a source of heat for extracting the ammonia from a concentrated solution in a boiler. These systems are also provided with an elevator tube, required for the circulation of the cooling liquid, which is also equipped with a source of heat.

Suggestions have been made to fit the elevator tube alone with a source of heat and at the same time to extract the ammonia from the solution within the elevator tube itself. This proposal proved impracticable, because irregularities in the circulation of the fluid and inadequate extraction of ammonia could obviously not be avoided. This led to the idea of so arranging the source of heat as to utilise it for both boiler and elevator, thus employing one and the same source of heat for the extraction of the ammonia and the circulation of the cooling fluid.

According to this proposal the heating element is placed in the lower part of a pipe encircled by the spiral elevator tube and whose upper part is filled with the fluid to be heated for the extraction of the ammonia. This solution makes it possible for the cooling system to function continuously. It requires, however, a constant and invariable production of heat by the heating element. Any increase in the amount of heat produced, results, however, in over-heating of the elevator tube, which is immediately adjacent to and around the source of heat, while on the other hand the fluid present in the upper part of the pipe containing the heating-element and forming the boiler from which the ammonia is to be extracted, is not simultaneously heated to the same extent, as its surface of contact with the heating element is very small.

Consequently the fluid is over-heated first in the elevator tube and then also in the upper part of the boiler so that, when the ammonia is extracted, it expels water with it. This made it necessary to introduce complicated water separators for condensing this water and conducting it back to the boiler. Furthermore, experiments have proved that even by fitting very elaborate separators total elimination of the water cannot be guaranteed and consequently an absolutely reliable cooling process is incompatible with a variable source of heat.

The present invention relates to an arrangement for absorption cooling systems which provides an absolutely reliable and continuous process even when the source of heat is variable. According to the present invention the boiler consists in the usual way in a pipe containing the heating element and the cooling solution. A fundamental characteristic of the invention is, however, that the heating element is so fitted in the pipe forming the boiler that it is bathed in the solution present in the boiler. In addition, the spiral of the elevator tube envelopes the pipe forming the boiler at the point at which the heating element is inserted.

Furthermore, it is advantageous to connect the conduit that carries off the cooling liquid, to the pipe forming the boiler at a certain distance from its lower extremity, so as to form a pocket for the elimination of impurities that might be deposited there. It is also well to fit the heating element in a tube inserted in the boiler from below.

Figure 2:
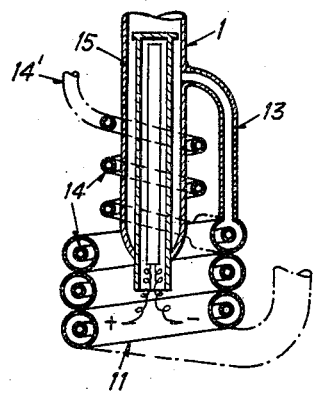

In the accompanying drawing Fig. 1 is an illustration of an absorption cooling system and Fig. 2 an example—enlarged—of one specific embodiment of the invention.

In Fig. 1, 1 represents the pipe forming the boiler and connected by conduit 2 to water-separator 3. Adjacent to the water separator is condenser 4, connected by conduit 5 to the heat-exchanging element 7 for gases. From conduit 5 a vertical tube 6 acting as a pressure regulator leads to the highest point of the system between water separator 3 and condenser 4. From heat-exchanger 7 for gases the liquefied cooling fluid reaches evaporator 8, which may be fitted in the usual way with slotted drip plates. From evaporator 8 the evaporated cooling fluid with the inert gas in which it is dissolved passes through conduit 9' to the lower part of absorber 10. Here the weak solution arriving from boiler 1 through tubes 11 and 12 flows downwards, thereby becoming richer in ammonia and releasing the inert gas which is carried back through conduit 9 and heat-exchange element 7 to evaporator 8.

On leaving absorber 10 the reconcentrated solution enters reservoir 10' whence it flows through conduit 14 to elevator tube 14' wound in a spiral round the lower portion of boiler 1. Elevator tube 14' reenters boiler 1 at its upper extremity. Conduit 14 is enveloped by tube 11; together they form the heat-exchange element for solution. Tube 11 opens into tube 13 leading to boiler 1. Conduit 12 connects tube 11 with the upper part of absorber 10.

It is unnecessary to describe in detail the manner in which the absorption plant thus schematically represented functions, as this is known and not a technical novelty.

Fig. 2 represents arrangement forming the object in which is fitted the heating element of the present invention. A tube 15 is inserted in pipe 1 forming the boiler at its lowest point. As Fig. 2 shows, the section of tube 15 in which the heating element is inserted, is so chosen that, except for the bottom, it is completely bathed in the cooling solution present in boiler 1. Around the lower portion of the boiler, at the point at which the heating element is fitted, elevator tube 14 is wound in a spiral. This spiral opens into conduit 14' which leads to the upper part of the boiler. Tube 11 in its turn leads to conduit 13 which runs into the lower part of the pipe forming the boiler, but at some distance from the bottom. The space between the entry of conduit 13 and the bottom of the boiler enables impurities to collect there and be eliminated.

The purpose and functioning of the arrangement forming the object of the present invention are briefly as follows:

As already mentioned, it is impossible to avoid fluctuations of the amount of heat supplied, either when electricity or gas is used as a source of heat. In fact, both the tension of the current and the pressure of the gas vary, and sometimes very considerably, with variations of the load on the mains. Such fluctuations cause, as we have said, irregular functioning of the system, overheating of the boiler and, in consequence, the presence of water in the ammonia. As even the use of bulky and elaborate water separators does not guarantee total elimination of this water, the continuous operation of the plant is endangered. It is, indeed, a well-known fact that water thus carried over can not only disturb the cooling process, but even interrupt it altogether.

In the arrangement described the heating source first heats the solution present in the boiler. As the temperature of this solution rises, the pipe forming the boiler is in turn heated, and so too spiral elevator tube 14 wound round its lower portion. This excludes the possibility of fluctuations in the source of heat causing sudden increases of temperature in the elevator tube not in accordance with that in the boiler. On the contrary, as the temperature in the boiler increases, the liquid flowing out through conduit 13 first heats the concentrated solution flowing in through pre-heating tube 11. For this reason it is only necessary to raise the temperature in spiral 14 a few degrees to make the fluid circulate, i. e. rise in elevator tube 14'.

The fluid rising in elevator tube 14' and so reaching the upper part of the boiler, will in consequence always be cooler than the solution present in the boiler itself and will thus reduce the temperature in the upper part of the boiler. Any increase of the amount of heat given off by the heating element is bound to intensify this process, as the solution in the boiler first becomes proportionately warmed and, in the second place, the circulation in elevator tube 14' is accelerated, so that a more intense cooling process takes place in the upper portion of the boiler.

Extensive experiments have shown that this arrangement ensures perfect functioning of the plant even when variations of heat occur, while, in addition, a minimum supply of heat for the circulation of the cooling fluid and the extraction of the ammonia is required.

I claim:

1. In an absorption refrigeration system, in combination, a vertical pipe constituting a boiler and adapted to contain the cooling solution, a heating element located within said pipe at the bottom thereof and spaced from the walls of said pipe, and an elevator tube having a top portion extending parallel to and removed from said boiler and having a top end communicating with the top portion of said boiler, and a lower spiral portion enveloping said pipe at the bottom thereof only in the immediate vicinity of and adjacent to said heating element, whereby said cooling solution is interposed between said heating element and said elevator tube.

2. In an absorption refrigeration system, in combination, a vertical pipe constituting a boiler and adapted to contain the cooling solution, a heating element located within said pipe at the bottom thereof and spaced from the walls of said pipe, an elevator tube having a top portion extending parallel to and removed from said boiler and having a top end communicating with the top portion of said boiler and a lower spiral portion enveloping said pipe at the bottom thereof in the immediate vicinity of and adjacent to said heating element, whereby said cooling solution is interposed between said heating element and said elevator tube, and a pipe connected to said boiler at a distance from the bottom thereof and opposite said heating element for removing the weak solution from the boiler.

3. In an absorption refrigeration system, in combination, a vertical pipe constituting a boiler and adapted to contain the cooling solution, a tube located within said pipe at the bottom thereof and spaced from the walls of said pipe, a heating element within said tube, and an elevator tube having a top portion extending parallel to and removed from said boiler and having a top end communicating with the top portion of said boiler and a lower spiral portion enveloping said pipe at the bottom thereof only in the immediate vicinity of and adjacent to said heating element, whereby said cooling solution is interposed between said heating element and said elevator tube.

OSCAR DOEBELI.

REFERENCES CITED

The following references are of record in the file of this patent:

UNITED STATES PATENTS

| Number | Name | Date |
|---|---|---|
| 1,729,355 | Munters | Sept. 24, 1929 |
| 1,799,201 | Von Platen et al. | Apr. 7, 1931 |
| 1,955,345 | Sarnmark | Apr. 17, 1934 |
| 2,051,760 | Ullstrand | Aug. 18, 1936 |
| 2,164,730 | Backstrom | July 4, 1939 |
| 2,202,373 | Dahl | May 28, 1940 |
| 2,251,746 | Lescarbeau | Aug. 5, 1941 |